United States Patent
Haines et al.

(10) Patent No.: US 6,366,980 B1
(45) Date of Patent: Apr. 2, 2002

(54) DISC DRIVE FOR ACHIEVING IMPROVED AUDIO AND VISUAL DATA TRANSFER

(75) Inventors: Jonathan Williams Haines, Lafayette, CO (US); Hedley Combs Davis, Milpitas, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/378,253

(22) Filed: Aug. 20, 1999

Related U.S. Application Data (60) Provisional application No. 60/137,754, filed on Jun. 4, 1999.

(51) Int. Cl.[7] .............................................. G06F 12/02
(52) U.S. Cl. .......................... 711/112; 711/5; 711/153; 711/173
(58) Field of Search ............................ 711/112, 4, 153, 711/173; 710/5, 266; 714/48

(56) References Cited

U.S. PATENT DOCUMENTS

| | | | |
|---|---|---|---|
| 4,637,023 A | 1/1987 | Lounsbury et al. | 714/54 |
| 5,012,459 A | 4/1991 | Odaka et al. | 360/32 |
| 5,210,851 A | 5/1993 | Kato et al. | 360/48 |
| 5,454,098 A | 9/1995 | Pisello et al. | 703/24 |
| 5,768,617 A * | 6/1998 | Liu | 710/5 |
| 5,995,306 A * | 11/1999 | Contreras et al. | 710/5 |

FOREIGN PATENT DOCUMENTS

| | | |
|---|---|---|
| EP | 0 880 136 A2 | 11/1998 |
| EP | 0880136 A2 * | 11/1998 |
| JP | 09223367 | 2/1996 |

OTHER PUBLICATIONS

Universal Serial Bus Specification, Revision 1.1, 1–2 Sep. 1998, sections 5.4–5.8, especially section 5.6.5.

World Wide Web Distributed Authoring and Versioning (WebDAV): An Introduction, E. James Whitehead, Jr., University of California, Irvine, *StandardView* Vol. 5, No.1, Mar./1977 pp. 3–8.

* cited by examiner

*Primary Examiner*—Hiep T. Nguyen (57) ABSTRACT

A disc drive apparatus that communicates with and provides data storage for a host computer wherein the disc drive is adapted to provide improved audio and visual data transfer operations. The disc drive determines whether the data transfer operation is related to audio/visual data and, if so, limits the number of retry attempts available during the data read or write command. Since audio visual data is more time critical than reliability critical, limiting retry attempts does not significantly impact presentation to the user. The disc drive also enables the transfer of relatively large blocks of data that can be transferred during a single command. Limiting the retry attempts and transferring more data during a single command significantly increases audio/visual data transfer throughput between the host computer and the disc drive.

24 Claims, 7 Drawing Sheets

DISC DRIVE FOR ACHIEVING IMPROVED AUDIO AND VISUAL DATA TRANSFER

RELATED APPLICATIONS

This application claims the benefit of U.S. Provisional Application Serial #60/137,754, entitled ACHIEVING A/V PERFORMANCE WITH ATA DISC DRIVES, filed Jun. 4, 1999.

FIELD OF THE INVENTION

The field of the present invention relates to reading and writing audio/visual data to and from hard disc drives. More particularly the present invention relates to methods and apparatus for improving performance when accessing audio/visual data stored on an disc drive.

BACKGROUND OF THE INVENTION

In general, there are two types of data stored on disc drives, normal computer data and audio/visual data. Audio/visual data relates to computer readable information stored on disc drives wherein the data corresponds to information that produces audio signals and/or visual signals. These audio and visual signals are used by a computer host to translate them into audio and video presentations through either a speaker or a monitor. Audio and visual data typically involves relatively large amounts of information that must be stored on a computer disc drive in order to produce actual audio or actual video. As an example, a movie that is approximately two hours in length may require approximately four gigabytes of computer storage space.

In addition to consuming considerable computer storage space, the information must also be transferred from the storage space to a host computer at a significantly high rate of speed. The host computer processes the information and conducts the information to an output terminal connected to either the speaker or monitor. As an example, a host computer system may comprise a "set top box" which receives television signals from either a cable connection or some other communications conductor. The set top box manages these television signals to ultimately provide signals to a connected television.

Often, the incoming signals are received in a particular format, such as Moving Picture Experts Group (MPEG) standards format or some variation thereof. The MPEG standards are an evolving set of standards for video and audio compression. As an example, MPEG-1 was designed for coding progressive video at a transmission rate of about 1.5 million bits per second. MPEG-2 was designed for coding interlaced images at transmission rates above 4 million bits per second. MPEG-2 is used for digital TV broadcast and DVD. The set top box must decompress or otherwise manipulate the data to present it to the television for viewing. Also, the set top box has memory so that the viewer is able to pause the viewing process, causing the incoming information to be stored in memory, and pick up where the viewer left off at a later time. Thus, upon re-starting the viewing process, the user views recorded information. In this particular situation, the set top box must manage two television signals or data streams, the incoming signal to record to memory and the outgoing signal conducted from memory to the user interface.

With the advent of picture-in-picture viewing, the set top box may be requested to provide two, and potentially more, separate data streams to the user interface. Of course, as more and more signals are conducted to the television, the set top box must handle significantly more information. In the situation where the user is viewing two signals and momentarily pauses each signal, upon resuming, the set top box must handle four data streams, two incoming signals and two outgoing signals. Consequently, the information must be handled efficiently in order to avoid losing incoming information or causing undesirable pauses in presentation of the information to the user. Additionally, if the information is stored to a disc drive, the information must be read from the disc at a relatively high rate in order to allow the host computer to process the information and present it to the user or viewer in real time, i.e., at a speed related to which the movie was recorded. Often, the information is not read quickly enough causing the resulting audio/visual presentation to contain gaps or otherwise have a decreased performance.

Typical Advanced Technology Attachment ("ATA") disc drives may be used to store the audio/visual information managed by the set top box. Unfortunately however, the typical ATA drive is not designed specifically for audio/visual data, and is in fact designed to work with normal computer data. Since normal computer data differs from audio/visual data in that each bit of normal computer data is potentially critical to the operational flow of the computer process, the typical ATA drive is designed to perform several tests on the data as it is stored and retrieved in order to insure that the correct information is stored and retrieved. The normal computer data is considered to be "reliability critical" wherein correct data storage and retrieval is much more important than any loss in time associated with achieving such reliability.

Audio/visual data, on the other hand is considered to be time or performance critical. If some of the audio/visual data is corrupt and unreadable, typically the presentation to the user is not seriously affected. Often such a loss in data may present only a flicker in the audio or video signal to the user or otherwise be undetectable. However, if the information is presented with many pauses or skips due to losses in time associated with trying to insure data reliability, the resulting presentation to the user is unsatisfactory.

One specific problem associated with some set top boxes and their ability to manage many streams of data using ATA disc drives is that the set top box incurs a significant amount of overhead time loss between requests for data from the ATA disc drive. In essence, each request decreases the performance of the audio/visual data manipulation process.

Another specific problem relates to dropping a revolution during communication since the data is sequentially placed on the disc drive.

SUMMARY OF THE INVENTION

The present invention relates to a disc drive system and process which manages the reading and writing of audio/visual data to and from the storage medium of the disc drive. With respect to one aspect of the present invention, the disc drive achieves improved performance by reading and writing the audio/visual data in relatively large blocks of data during one command. Instead of accessing less than a track during one command as prior art disc drives, the present invention allows for ten or more tracks of data to be accessed during one data access command. Increasing the accessed block size decreases lost seek time and other overhead time that occurs each time a command is requested to conducted to the drive.

In accordance with another aspect of the present invention, improved audio/visual data access performance is achieved by limiting the number of retries or error correction processes that occur during normal read and write data accesses. Reducing or limiting the number of retries significantly increases the throughput of audio/visual data and the erroneous data is typically not critical to the operation or presentation of the audio/visual signal.

These and various other features as well as advantages which characterize the present invention will be apparent from a reading of the following detailed description and a review of the associated drawings.

DETAILED DESCRIPTION OF THE PREFERRED EMBODIMENT

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
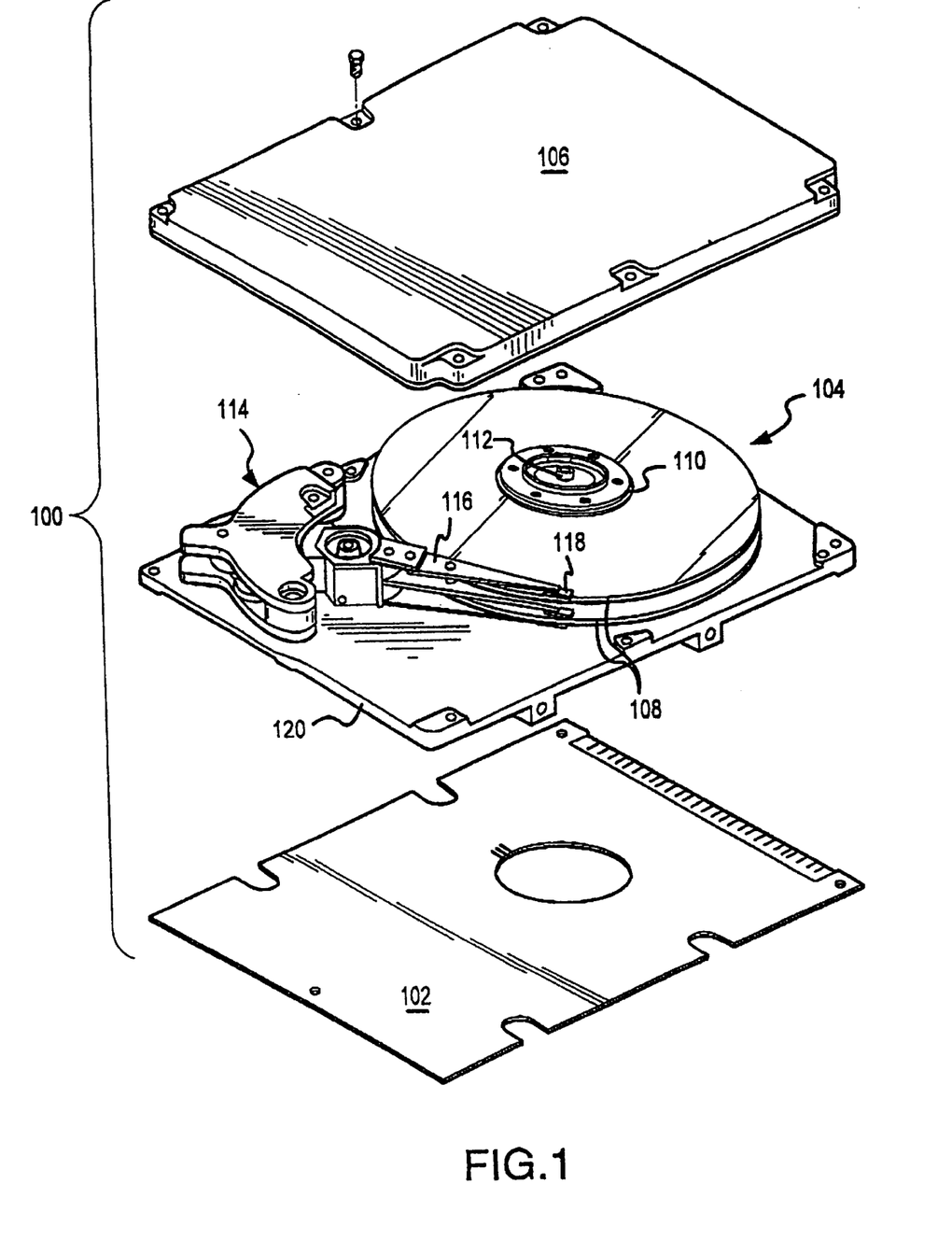
FIG. 1 is an exploded view of disc drive incorporating the present invention having a head disc assembly and printed circuit board assembly.

FIG. 1 illustrates a disc drive 100 of the present invention. The disc drive 100 has a printed circuit board 102, a head disc assembly portion 104 and a cover plate 106. The head disc assembly portion 104 comprises a plurality of disc platters 108 that are attached to rotate with a hub 110 about a fixed shaft 112, a separate voice coil motor 114 operates to move one or more arms 116 over the spinning disc platters 108 so that magnetic read/write heads 118 can access any part of the disc platters 108. The printed circuit board 102 and the plate or top cover 106 are attached to opposite sides of base plate 120 of the head disc assembly 104. The top cover 106 fits over the voice coil motor 114, the arms 116, the disc platters 108. The printed circuit board 102 is used to connect the disc drive 100 to a host computer system (shown in FIG. 2) and control many of the functional operations of the disc drive 100.

Figure 2:
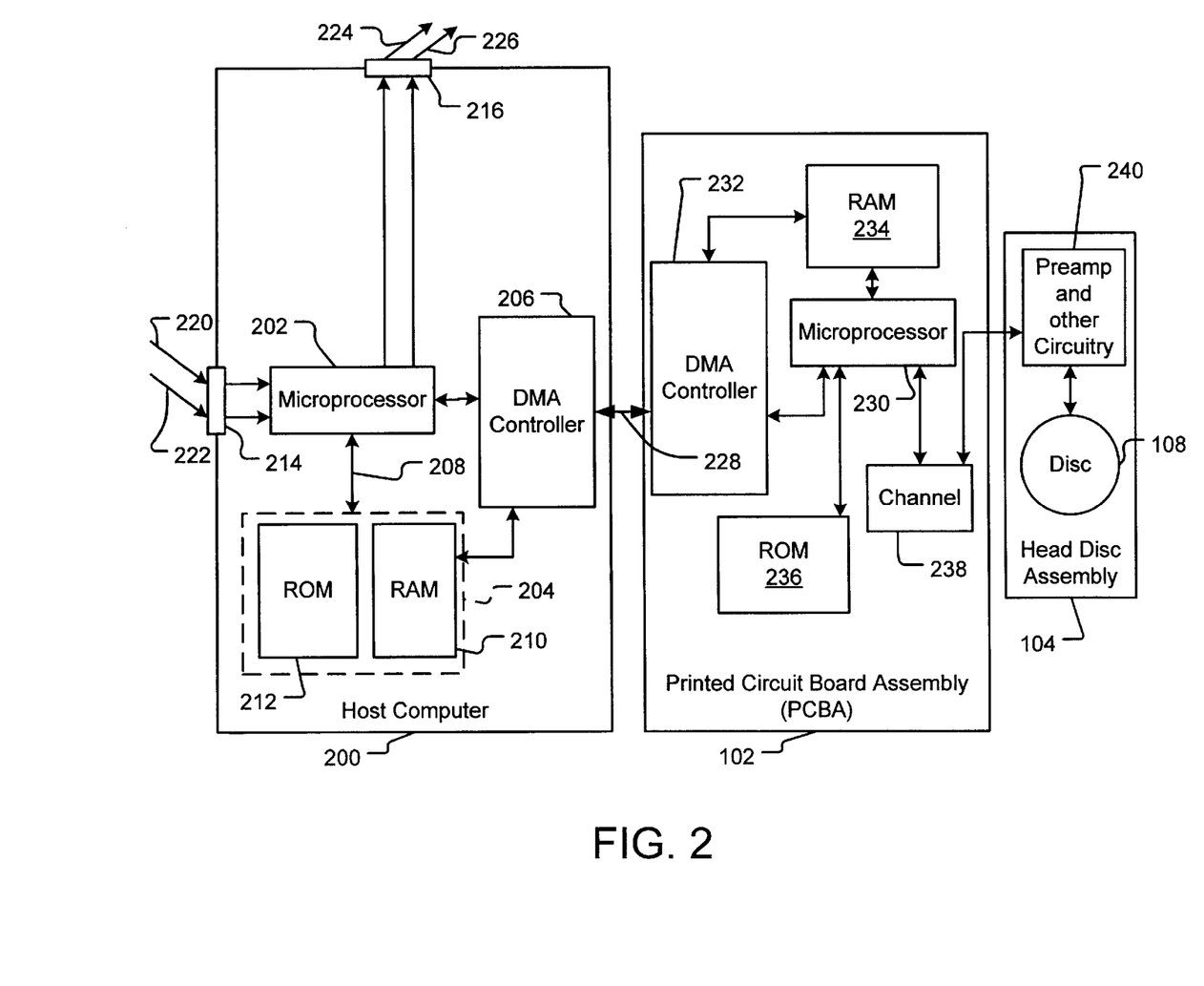
FIG. 2 shows electronic elements of the disc drive shown in FIG. 1 including the printed circuit board assembly which contains processing elements for exchanging data with a host computer.

FIG. 2 is a block diagram illustrating the printed circuit board 102 connected to the head disc assembly 104 and a host computer system 200. Many of the operations performed by this invention occur as a result of a microprocessor executing a software program. Generally, programs include routines, programs, objects, components, data structures, etc. that perform particular tasks or implement particular abstract data types. Moreover, those skilled in the art will appreciate that the invention may be practiced with other computer system configurations, such as laptop PCs, desktop PCs, multiprocessor systems, micro-processor based or programmable consumer electronics, network PCs, mini computers, main frame computers and the like. Preferably, the host computer system 200 is a set top computer system such as a "Web TV" system provided by Microsoft Corporation.

The host computer 200 has at least one central processing unit (CPU) or microprocessor 202, a memory system 204, an input device (not shown), and an output device such as a television (not shown). Additionally, the host computer also comprises a direct memory access ("DMA") controller. These elements are coupled by at least one system bus 208.

The microprocessor 202 is of familiar design and includes a collection of registers (not shown) for temporary storage of data and instructions. The microprocessor 202 may have any of a variety of architectures including, but not limited to those architectures currently produced by Intel, Cyrix, AMD, IBM and Motorola.

The system memory 204 comprises a random access memory (RAM) 210, and read only memory (ROM). In addition to the disc drive 100 (FIG. 1), the host computer system memory 204 may incorporate a secondary storage (not shown) in the form of long term storage mediums such as floppy disks, tape, compact disks (CDs), flash memory, etc. and other devices that store data using electrical, magnetic, optical or other recording media. The system memory 204 may also comprise video display memory for displaying images through the output device. The memory can comprise a variety of alternative components having a variety of storage capacities such as magnetic cassettes memory cards, video digital disks, Bernoulli cartridges, random access memories, read only memories and the like may also be used in the exemplary operating enviroment. Memory devices within the memory system and their associated computer readable media provide non-volatile storage of computer readable instructions, data structures, programs and other data for the computer system.

The system bus 208 may be any of several types of bus structures such as a memory bus, a peripheral bus or a local bus using any of a variety of bus architectures.

The input and output devices communicate with the host computer system 200. Such devices may be a keyboard, a mouse, a microphone, a touch pad, a touch screen, a handheld remote control, etc. The output devices can be a display, a printer, a speaker, a television, a touch screen, etc. Some devices, such as a network interface or a modem can be used as input and/or output devices. The input and output devices are connected to the computer through system buses 208.

The computer system 200 further comprises an operating system and usually one or more application programs. The operating system comprises a set of programs that control the operation of the system 200, control the allocation of resources, provide a graphical user interface to the user, facilitate access to local or remote information, and may also include certain utility programs such as the email system.

The host computer system 200 receives signals from the input terminal 214. The input terminal 214 may be connected to various communications-type lines such as telephone, cable, ISDN, DSL, etc. Preferably, the host computer system can receive at least two data streams 220 and 222 at approximately 10–20 megabits per second each. The information received through the input terminal 214 is managed by the microprocessor 202 and the DMA controller 206. The received information is preferably transferred to a microprocessor 230 the printed circuit board 102 of the disc drive 100 (FIG. 1). Also, while this information is being stored to the disc platter 108 as it is received, the host computer system is also capable of conducting two output data streams 224 and 226 at a similar rate, i.e. 10–20 megabits per second through output terminal 216 to the output device (not shown). Since all this is done relatively simultaneously, the data transfer rate is approximately four times the individual transfer rate of streams 220, 222, 224 and 226, shown logically in FIG. 3.

Figure 3:
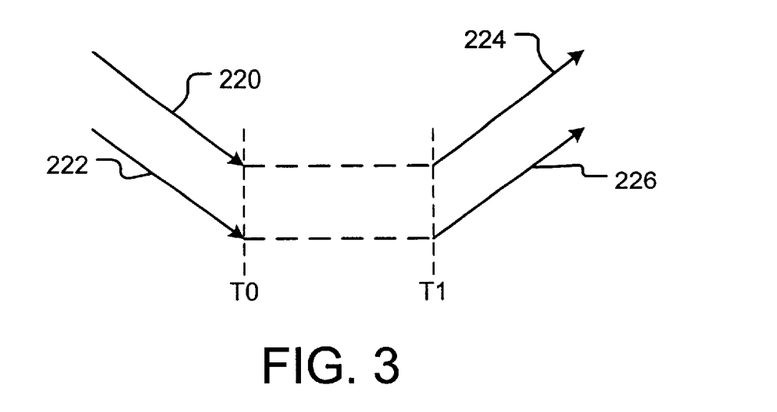
FIG. 3 is a logical representation of four data streams managed by the host computer depicted in FIG. 2.

FIG. 3 illustrates the flow of four data streams as handled by the computer system 200. Two data streams 220 and 222 represent the two separate channels or data streams as input or as connected to the input terminals of the host computer system where output data streams 224 and 226 represent the signals conducted to the output terminals of the host computer system. The space between input and output data streams is representative of a induced delay from the time T0 when data is received by the host computer 200 from one of data streams 220 or 222 and when it is actually conducted to one of the output terminals at time T1. The time from T0 to T1 defines a time-delay period related to the data streams.

The microprocessor 230 on the printed circuit board assembly 102 is adapted to receive and send signals to and from the host computer system 102 and is used to facilitate the transfer of data streams from the input terminal 214 to the actual disc platters 108 (FIG. 1) of the head disc assembly 104. The information is stored to the platters 108 until the user desires to view the information. When desired, the microprocessor 230 on the printed circuit board, in combination with the host computer 200 and the head disc assembly 104 retrieves the information for presentation to the user.

The microprocessor works in conjunction with a DMA controller 232 which facilitates a relatively quick transfer of data between RAM 234 and the cable 228. Additionally, the microprocessor executes software stored in ROM 236. The data is conducted through channel 238 and a preamp and other circuitry 240 to/from the discs 108.

The communications between the elements on the printed circuit board 102 and the host computer 200 occur over an ATA cable 228 and follow the ATA ATA/ATAPI protocol. The ATA protocol defines the format and type of commands recognizable to both the disc drive 100 and the host computer 200. Although ATA compliant, the drive 100 also has the capability to read and write audio visual data in a unique manner to increase the performance timing of storing and retrieving data for the host computer system 200.

The disc drive achieves the increased performance, in part, by enabling large command counts to read/write command to transfer a large number of sectors with a single command and by dynamically adjusting the number of retries in the event of errors during a read or write operation.

Figure 4:
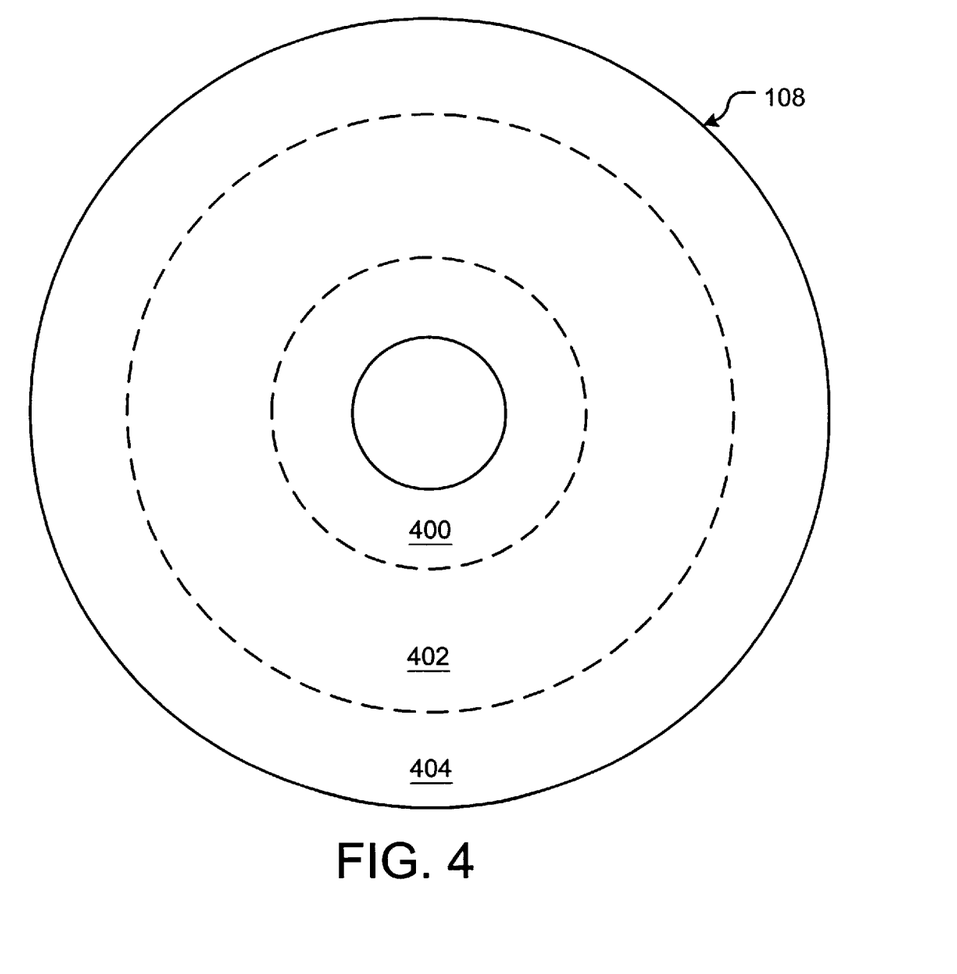
FIG. 4 is a logical representation of a disc platter showing an aspect of the present invention.

In one preferred embodiment, an A/V partition is set up for the storage space on the recording discs as represented in FIG. 4. Each disc or disc platter has an inner diameter section that is used for normal computer data. The inner section is preferred for normal computer data since this is the "slowest" portion of the disc platter 108 with respect to the speed at which data can be read or written to the disc. In essence the speed at which data can be accessed is quickest at the outer diameter.

Section 402 is set up as the A/V partition and section 404 is another section or partition of computer data type information. Although the outer section has the quickest access times and thus would be the best location for the time-critical A/V data, the outer portion is also the standard the location for the placing ATA computer information that is accessed when the system boots up. Therefore, the A/V partition is configured to be between the two computer data type partitions. Setting up these partitions allows data to be handled in a different manner depending on its address or location of a data block on the disc.

In order to set up an A/V partition 402 the printed circuit board 102 receives a command from the host indicating the minimum logical block address ("LBA") of the A/V partition and a maximum LBA for the A/V partition 402. In essence, the host is setting up the region for A/V data by specifying the minimum and maximum values for the A/V data range in disc storage space. Those values are sequential values known as LBAs, logical block addresses. Logical block addresses are simply a sequential number related to each and every sector on the hard disc drive. Now a read/write command that contains an LBA inside the A/V data range or A/V partition is recognizable as a A/V read/write command.

In another preferred embodiment, the host may specify that a read/write command is an A/V command. In this embodiment, it is not necessary to set Up an A/V partition in the disc storage space.

Figure 5:
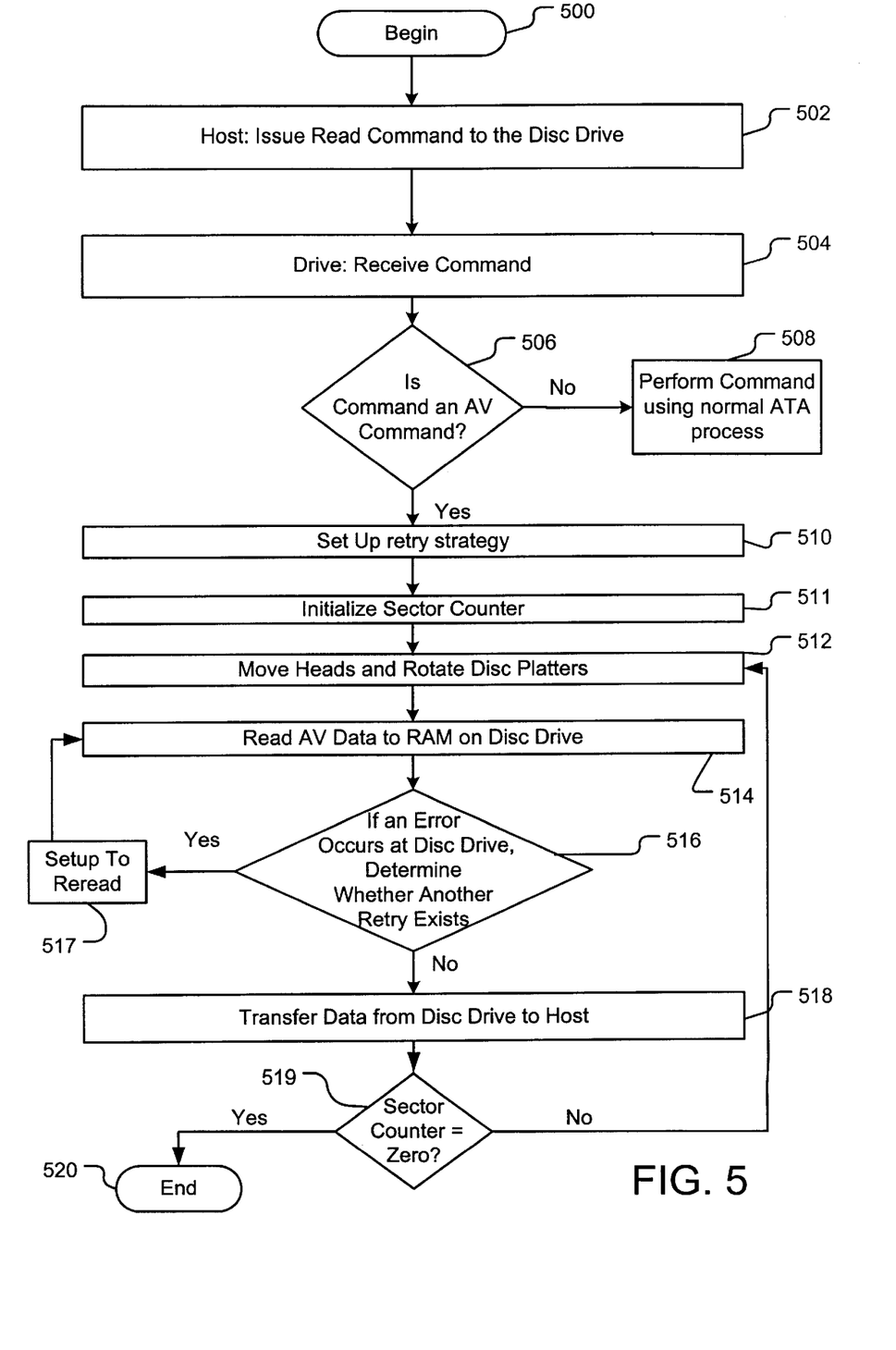
FIG. 5 is a flow chart of operations and communications between the host computer system and the processing elements of the printed circuit board assembly illustrated in FIGS. 1 and 2 during an audio/visual data read operation.

FIG. 5 illustrates a flow chart of logical operations of a read command as performed in a preferred embodiment of the present invention. As shown in FIG. 5 operation flow begins at 500 is used to handle read commands for audio/visual data. The issue operation 502 at the host computer issues a read command. The command issued by the host at operation 502 contains an LBA and a count where the count is sufficient to access a block of data large enough to allow sustained audio/visual performance to a predetermined specific design criteria. Examples of specific design criteria include the number of data streams to be managed by the host and most likely the rate at which that data must be read. This criteria relates to the overall number of bytes per second necessary to achieve satisfactory audio/visual presentation to the user in a worst case situation.

The disc drive receives the command from the host at operation 504. Decision operation 506 is performed by the disc drive and interprets the read command received from the host to detect if the command is an A/V command or a normal command. Interpretation of the command involves determining whether the command relates to audio/visual data or whether it relates to normal computer data. If the command includes an A/V indication or flag, operation 506 tests for the A/V indication or flag. If A/V partitioning of storage space is being used, operation 506 tests whether the LBA is within the A/V data range or partition. If the command is a normal read command, the operation flow branches NO to normal ATA operation 508. Operation 508 executes the read command at the disk using the normal read operations for computer data. If the command is an A/V command, the operation flow branches YES to set retry operation 510.

Set operation 510 in the disc drive sets up appropriate retry strategies for the A/V command. In effect, operation 510 sets the number of retries in the event of a detected error in the read operation. The number of retries will be set so as to make an effort to provide an error free A/V data stream short of not interfering with a stream of data sufficient to maintain the audio/visual performance. Operation 510 is described in more detail hereinafter with reference to FIG. 7.

Initialize sector counter operation 511, when the count in the read command is 256 or less, loads the sector counter with the count from the read command. When the count is a large count, as is usual in an A/V command, operation 511 sets the count to 255. This sector count is counted down for each sector read, and is used by block size monitor decision operation 519 to determine when the read command is completed.

Operation 512 rotates the disc platters and moves the heads to the correct track. When the desired sector is immediately below the heads, read data operation 514 begins reading data to RAM 234 on the disc drive. During the read operation the disc drive applies any error correction code correction that it can and indicates that data is ready for the host. Test operation 516 looks for errors in the read operation. If an error occurred, and if the number of retries set by operation 510 have not be used up, the operation flow branches YES to setup operation 517. Setup operation sets tip the drive to reread the sector where an error occurred. Read operation 514 rereads the sector. If there is no error or no more retries exist, the operation flow branches NO to data transfer module 518. Module 518 transfers data from RAM 234 in the disc drive to memory in the host 200 through DMA controllers 232 and 206. Sector counter decision operation detects whether the count in the sector counter is zero. A block size monitor operation is operating asynchronous to the data read and data transfer operations. When the sector count is zero as detected in the block monitor operation, the read operation is complete, and the operation flow for the read command ends at 520. If the sector count in the sector counter is not zero, the read command is not complete. More data remains to be read and transferred, and the operation flow returns to operation 512. The block monitor operation is described hereinafter with reference to FIG. 8.

Figure 6:
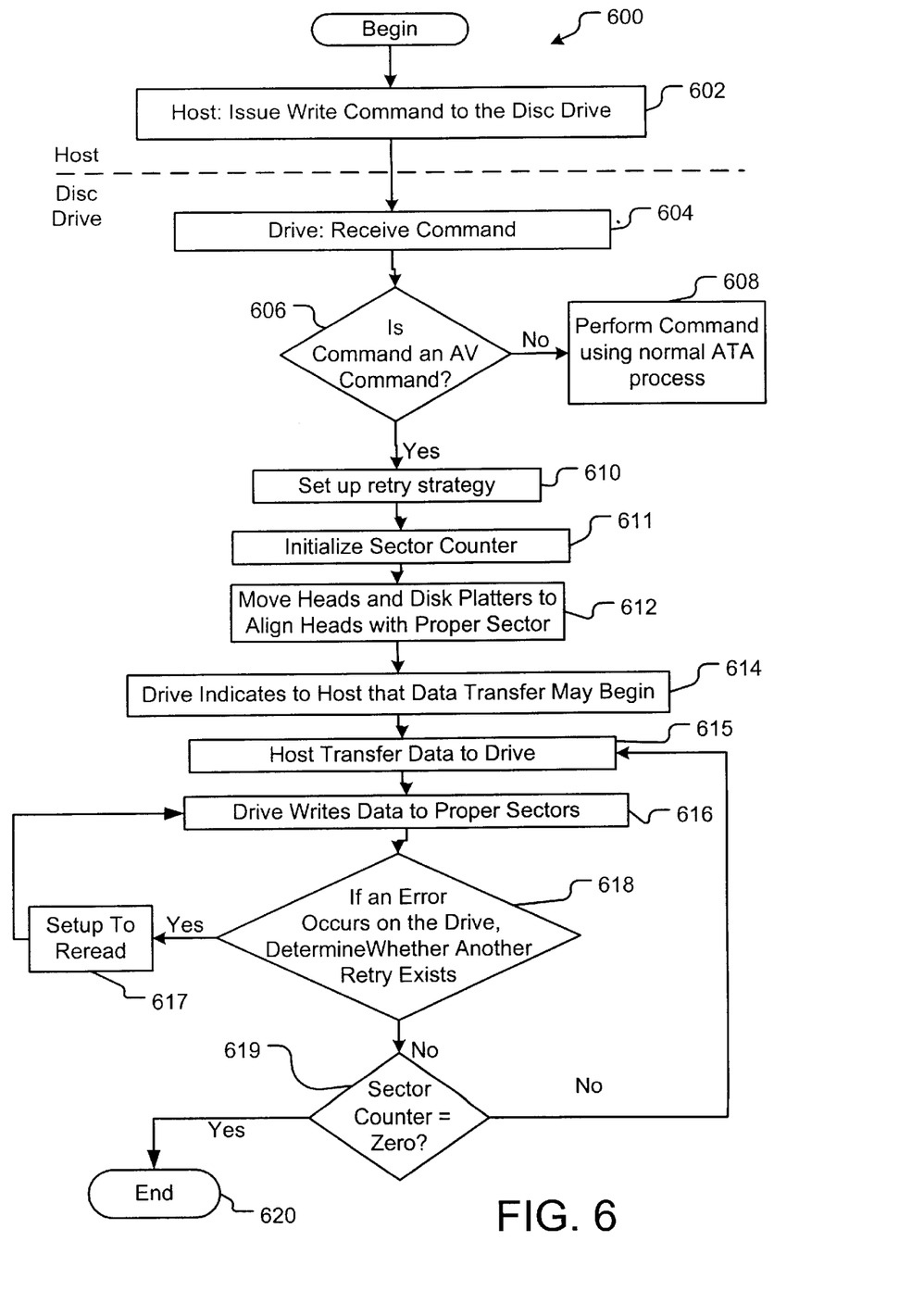
FIG. 6 is a flow chart of operations and communications between the host computer system and the processing elements of the printed circuit board assembly illustrated in FIGS. 1 and 2 during an audio visual data write operation.

FIG. 6 represents handling of an audio/visual data write command process 600. The process begins at 600. The host issues a command at issue operation 602. The command issued by the host is passed to the disc drive with a sector count for the block size sufficient to allow sustained audio/visual data performance to achieve design goals, dictated by number of data streams and a predetermined byte-stream data rate. Once issue operation 602 has passed the write command to the disc drive, operation 605 in the drive receives the write command and interpretation operation 606 interprets the command and determines whether or not the command is a normal or audio/visual command. Operation 606 operates in the same manner as operation 506 discussed above for FIG. 5. If the command is a normal write command it is handled by operation 608. If the command is an A/V command the operation flow proceeds to set operation 610.

Set retry operation 610 sets the retry strategy to determine the number of retries in the event of an error during a write operation. Operation 611 initializes the sector counter in the block monitor operation. Operations 610 and 611 operate in the same manner as previously described for operations 510 and 511 in FIG. 5 and as shown in detail in FIG. 7 and FIG. 8, respectively.

Operation 612 moves the heads and disks to align the heads with the proper sector. Once the seek has begun, indicate operation 614 indicates to the host that the data transfer may begin. In operation 615 the host begins transferring data to the disc drive. If there is no disc drive buffer space available for the data, the host may be required to pause or wait until such space is available.

Once the heads are above the correct track and over the correct sector, operation 616 writes data to the discs. If an error occurs during the execution of the write operation, test operation 618 detects the error condition and determines if a retry is allowed. If there is sufficient time for a retry as determined from the set operation 610, operation flow branches YES to setup operation 617. Setup operation 617 sets the disc drive up to rewrite the sector where an error occurred during the write operation. Operation 616 again writes to the sector where the error occurred. If there is no more time or retries allowed, operation flow branches NO, and the operation flow ends at 620.

When all the commanded data has been transferred from the host and has been written or attempted to have been written based on available retries, operation 618 reports any region that contained one or more sectors that the drive could not successfully write and sends an interrupt request to the host.

Sector count decision operation 619 detects whether the count in a sector counter is zero. A block size monitor operation is operating asynchronous to the data read and data transfer operations. When the sector count is zero as detected in the block monitor operation, the write operation is complete, and the operation flow for the write command ends at 620. If the sector count in the sector counter is not zero, the write command is not complete. More data remains to be transferred and written, and the operation flow returns to operation 615. The block monitor operation is described hereinafter with reference to FIG. 8.

Figure 7:
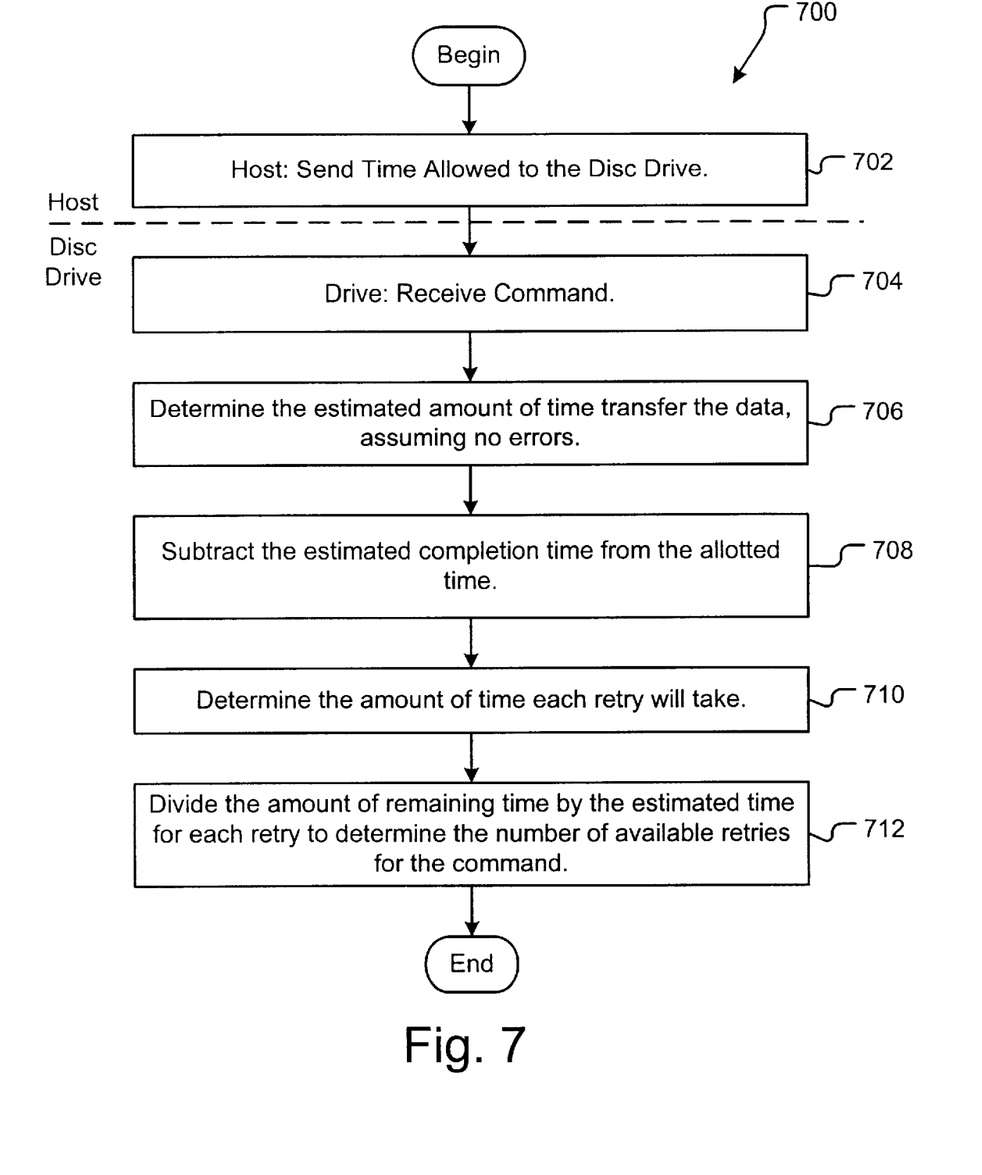
FIG. 7 illustrates the logical operations in the set the retry strategy modules in FIG. 5 and FIG. 6.

FIG. 7 illustrates functional operations involved in set retry operation 510 and 610. The set operation begins at 700. Initially, send operation 702 sends a command from the host to the drive and that command contains an indication of how much time the host will allow the drive to complete the command. In one embodiment this is a seven-bit time field. For example, the time field could give the number of five-millisecond units of time available, adding up to the overall time available to perform the operation.

The drive receives the command at operation 704. Once the drive receives the command, determine operation 706 determines the estimated amount of time the operation should take based on such factors as the number of sectors requested, the estimated seek time, the time it will take to rotate to the first sector requested, the time it will take to transfer the data to or from the host, and how much overhead time is needed, etc. Much of the estimated time can be precomputed and stored in a lookup table to increase efficiency. If the estimated time is more than the allotted time, the drive can either return an error or can merely transfer as much information as possible in the allotted time.

Assuming the allotted time received from the host is greater than the estimated completion time, subtract operation 708 subtracts the estimated time (determined at operation 706) from the allotted time to determine the "remaining" time. The remaining time is the time available to the drive to potentially perform retry operations during the command.

Following the determination of the remaining time, determination step 710 determines the estimated time for conducting a retry. This number is based on the amount of the rotation time of the disc, since a retry typically only involves dropping a revolution and trying again to read/write the same sector. This number may vary based on the track but an average can be precomputed and stored in lookup table for efficiency.

Divide operation 712 then divides the remaining time by the estimated time per retry to determine how many retries may be used during the operation. Once the number of retries is set, the strategy can be set to operate a counter to utilize the retries as necessary, but once no more retries exist, as determined by the counter, data with errors must be transferred to the host in order to achieve the transfer during the allotted time. Otherwise, data from the host must be discarded.

As an example, the command may request a read of 2000 sectors of data and require that the entire read take 200 milliseconds or less. The drive determines that it will take approximately 165 milliseconds to complete the transfer. This leaves a remaining time of 35 milliseconds. If each revolution takes approximately 11 milliseconds, then three retries can be attempted during the read operation.

In another embodiment of this invention, the set retry strategy operation is performed at the host. The host will keep a history of performance of the disc drive and thereby know the length of time to perform various operations in the disc drive for different block sizes. Therefore, the host can perform the operations in FIG. 7 and send to the disk drive a parameter in the command that indicates the number of retries allowed.

Figure 8:
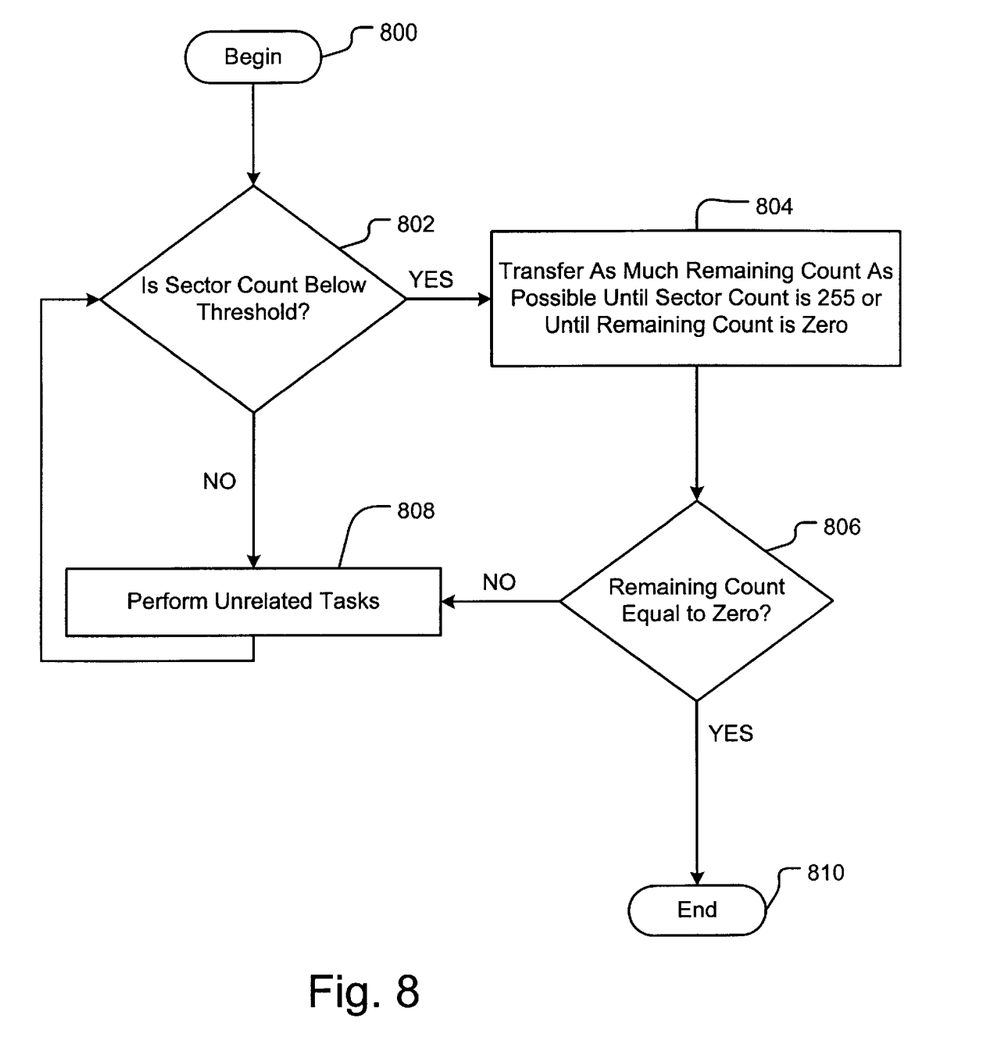
FIG. 8 illustrates the operation of a portion of the block size monitor operation.

The block monitor operation is made up of the decision operations 519, 619 in FIG. 5 and FIG. 6 respectively plus the operations in FIG. 8. The block monitor makes use of a sector counter (not shown) and a remainder counter (not shown) containing initially the count from the read or write command which count becomes the remaining count as sectors are transferred and the sector counter is updated. The sector counter is initialized as discussed above in FIGS. 5 and 6. For the usual A/V command with a large count greater than 255, the initial count in the sector counter is 255, and the remaining count is reduced by 255. When each sector is read, the sector count is decremented.

The operation in FIG. 8 begins at 800. Operation 802 detects when the sector count in the sector counter goes below a threshold. If the sector count is not below the threshold, operation 808 performs unrelated operations such as serving and returns the flow to again detect the count in the sector counter. When the sector count does go below a threshold such as twenty, operation 804 transfer count from the remaining counter until the count in the sector counter is back up to 255. For example, if the count in the sector counter is 15 when the test operation 802 detects the count is below the threshold, than the remaining Count in the remainder counter is reduced by 240 and 240 is added to the sector counter.

Operation 806 tests whether the remaining count was reduced to zero. If not the operation flow returns to operation 808 and then to test operation 802. Operation 802 again tests whether enough sector transfers have occurred so that the sector count is below threshold. Sector count is decremented as sectors are read/written and transferred. When the sector count again goes below the threshold, operation 804 repeats. During one of these loops through 802, 804, 806 and 808, the remaining count will not be large enough to bring the count in the sector counter back up to 255. The sector count will just go up until the remaining count is zero. When operation 804 has updated the sector counter, operation 806 detects that the remaining count is zero. The operation flow then ends at 810. Effectively, if the loop in FIG. 8 is shut down, the sector count decision block 519 or 619 looks for the sector count to go to zero to detect completion of a read or write command.

The following description is an detailed outline relating to one preferred implementation of the invention.

0. Overview

This proposal defines a protocol by which a host (not necessarily a traditional Personal Computer) can communicate to an A/V-ready ATA drive that the host wishes to perform some reads and writes that are more time-critical than they would be in a normal drive (which is only aware of reliability-critical computer data). Terminology regarding the issuance of commands follows that of the Advanced Technology Attachment/Advanced Technology Attachment Packet Interface ("ATA/ATAPI") protocol. In particular, a host attempt to write to the command block registers while the Busy bit ("BSY") is set in the Status register shall be ignored by the device. Therefore, the host will be deemed to have "issued a command" only if the command is sent to the drive after the drive finished any previous command. Write caching is disabled on an A/V-Ready drive that supports this specification revision, when A/V commands are enabled. When the drive indicates command completion, it is completely done with a command (with the possible exception of write retries, as explained in WriteA/V), and is ready to perform another command immediately.

0.1 Definitions

Normal Data (ND)

Reliability-critical computer data which may require full error recovery.

Audio Visual Data (A/V)

Time-critical data, where commands should be completed within specified time. If error recovery is not practical within the allowed time, the erred data is transferred to the host, and reported as erred.

A/V Command

This is a DMA read/write data command that is issued via command code 0×C9 or 0×CB while A/V commands are enabled.

ND Command

This is a read/write data command that is either issued in PIO mode, or in DMA mode via command codes 0×C8 or 0×CA, or command codes 0×C9 or 0×CB while A/V mode commands are disabled

1 Enabling Audio-Visual Features

1.1 Enabling A/V Features

The use of the ATA SetFeatures command, with a subcommand code of 0×04 (defined as Obsolete, but previously (ATA version 3), "Enable all Automatic Defect Reassignment") is proposed to enable the use of the 0×C9 and 0×CB command codes for the reading and writing of A/V Data. This subcommand code is be used until ATA standardization can be accomplished.

The enabling of A/V command code interpretation shall remain in force through a Soft Reset, but not a Hard or Power-on reset. Commands issued to the drive in A/V mode must be issued by the host as Logical Block Addresses (LBAs), but the command will not be issued in LBA mode (see ReadAV/WriteAV Inputs).

The value of the Sector Count register will identify whether:

A/V command interpretation is being enabled or disabled by the host, or

IRQ is being enabled or disabled upon completion of host-soft-reset (sRST) processing.

If the drive is unable to enable/disable the indicated A/V feature, it will abort the command. Table 1 illustrates the sector count register values and their respective meanings.

TABLE 1

| Sector Count Register Value | Meaning | ID Word (TBD), : |
|---|---|---|
| 0 | Disable 0xC9 and 0xCB command opcodes from being interpreted as "A/V" commands | xxxxxxxxxxxxxx0 |
| 1 | Disable IRQ upon completion of sRST processing | xxxxxxxxxxxxx0x |
| 0xFE | Enable IRQ upon completion of sRST processing | xxxxxxxxxxxxx1x |
| 0xFF | Enable interpretation of command codes 0xC9 and 0xCB as "A/V" commands | xxxxxxxxxxxxxx1 |

1.2 Enabling large command counts

The American National Standards Institute ("ANSI") X3T13 committee reviewed, in May 1999, a proposal for support of "Really Big" LBAs and 16-bit command counts. However, since the proposed protocol requires a hardware change on the drive side, and it has not yet been accepted for inclusion in ATA/ATAPI-6, the following protocol change provides a bridge for the short-term, while the new method is still being negotiated.

To enable counts in the range [257,4095], the host shall issue a SetFeatures command, with a subcommand code of TBD, with the count register set to 16 decimal. This will indicate to the drive that the host desires to issue commands with counts up to 16 times the normal range. Thereafter, Read and Write commands issued to the drive (both ND and A/V) shall use the content of the least-significant 4 bits of the features register, concatenated with the count register as the commanded count. In this mode, a commanded count value of zero will be interpreted as a count of $2^{12}$ by the drive.

1.3 Defect Management

Since extra seeks are the bane of streaming reads and writes, sparing of A/V data sectors needs to be avoided. The only reasons why a spare might exist in A/V data sectors are:

Alternation was performed on data sectors that were previously read or written in ND mode, and are now being read or written in A/V mode.

An offline scan (Self Monitoring And Reporting Technology "SMART") detected a bad sector and alternated it Previously-alternated sectors, and sectors marked "Pending reallocation" should be accessed, when in A/V mode, from their original (unalternated) locations, without special handling. In A/V mode, the only defect mapping that will be handled are slips (A.K.A. "skips").

It is recommended that the host perform flaw-mapping on sectors that have persistent errors, on the host side in a method similar to a File Allocation Table (FAT).

2. Host Reset Processing

The drive does not need to support ATAPI Device Reset, but does need to have a quick (on the order of a millisecond) response time to ATA soft reset. That is, the host needs to have a way to interrupt a command that is currently being processed by the drive (which may have had a huge count) so that it can issue a more time-critical command.

In addition, the host may need to abort off-line write retries, or a FlushCache command (see WriteAV).

In addition, the drive shall set interrupt request ("IRQ") upon completion of soft reset processing, if this feature has been enabled (see 1.1).

The most obvious way for an ATA-compliant drive to do this is:

If the system only has one drive per ATA port, then a master drive never has to wait on a slave. If there are two drives on a port, but both drives are A/V-extension compliant with respect to reset handling time, and have had write caching disabled, then the reset handling time will also be tightly constrained. Note: having a slave will cause an ATA master to have to wait at least one millisecond before looking for the slave's completion status. For this reason, one drive per port simplifies matters considerably, but is not necessary as long as the host does not mind waiting an extra millisecond on reset processing.

Disable Write Cache (in some drives through a vendor-specific mechanism, perhaps related to the enabling of the A/V command opcodes). While it is possible that the drive could disable write caching only for A/V mode commands, the resultant complexity that falls out for the state transitions (Cached ND write to non-cached A/V write, etc.) make this unappealing. Since ND writing is not "time-critical", it should not be an issue to disable caching for writing of "normal data".

Discard write data that has been transferred to the drive, which has not yet been written to the drive, as the ATA/ATAPI specification allows, considering that write caching is disabled. Note that the protocol does not currently support a status to be returned to the host for any write that was still in progress at the time of a reset, so the exact status of a write command that is interrupted by a Host Soft Reset will not be known.

There is a side benefit to disabling the write cache. The host will know when the allowed write-passes on the data are completed, and what the error status is for the write. The disadvantage is that a revolution will be wasted between sequential host write commands. However, matching the command size to the block size used in the sequential streams, or using very large counts (so that the dropped revolution is insignificant compared to the command's sustained data transfer rate) mitigate this problem. In any case, waiting for a full revolution (in the sequential, non-cached writing case) still takes considerably less time than performing a full-stroke seek and a full rotation (in the worst-case), so this issue is seen as not highly significant, since it does not affect the worst-case performance scenario.

3 A/V Data (Time-Critical) Access Commands

Any DMA read or write command issued as opcode 0×C9 or 0×CB, while A/V mode commands are enabled shall be interpreted as an A/V data access request, and shall be implicitly interpreted as an LBA-addressed request. In an arbitrated-for-worst-case host system, there will likely be time for a limited (non-zero) number of retries per new command, and for the continuance of retries on a sector for which the drive had to previously report an error. Because of this likely scenario, the concept of "Allowed Passes" on data is introduced. During an A/V operation (either Read or Write), the drive may attempt to read or write a sector under the following conditions:

The drive has not yet attempted to Read/Write the sector (with the exception that if there is only time for one pass over the remaining data, and an error occurs that causes some sectors to be not read/written (sync error, etc.), then there may be some sectors that will not even be read or written once).

The drive has enough buffer available to the host that the drive deems that the retry will be entirely hidden from the host (I.e. given the host's transfer rate, the buffer available to the host will last for more than a revolution time.)

The drive has not used up the allotment of time that the host granted, on a per-command basis, and computes that it will have enough time left over for a retry. The drive could have the host's sustainable rate programmed into it, so that it can back-compute how much time is available for retries after considering the Seek, Rotational latency, and data transfer time costs.

3.1 ReadAV/WriteAV Inputs

TABLE 2

| Register | 7 | 6 | 5 | 4 | 3 | 2 | 1 | 0 |
|---|---|---|---|---|---|---|---|---|
| Features | Time Allowed[3 . . . 0] | | | | Count[11.8] | | | |
| Sector Count | Count[7 . . . 0] | | | | | | | |
| Sector Number | StartLBA | | | | | | | |
| Cylinder Low | StartLBA | | | | | | | |
| Cylinder High | StartLBA | | | | | | | |
| Device/Head | Time Allowed[6 . . . 4] | | | | DEV | | StartLBA | |
| Command | C9 (ReadAV); CB (WriteAV) | | | | | | | |

Time Allowed

The time that the host will allow this A/V command to take (in units of 5 ms) as shown in Table 2. If the time specified by the host is less than the drive computes that it needs for even a single pass by all of the data, the drive shall allow only one attempt at each of the data sectors indicated by the host.

Sector Count

This value indicates the number of sectors that the host wishes to read or write for this command.

StartLBA

Defines the first Logical Block Address ("LBA") that the host wishes to read or write.

Device/Head register

LBA shall be set to one. Device ("DEV") shall indicate the selected device.

3.2 ReadAV/WriteAV/Flush Cache A/V-Error Outputs

Register values readAV and writeAV commands are shown in Table 3.

TABLE 3

| Register | 7 | 6 | 5 | 4 | 3 | 2 | 1 | 0 |
|---|---|---|---|---|---|---|---|---|
| Error | AVErr | na | na | na | na | na | na | na |
| Sector Count | Recovery Restart | | | | | | | |
| Sector Number | Error Length [7 . . . 0] | | | | | | | |
| Cylinder Low | Offset to Error in Command [7 . . . 0] | | | | | | | |
| Cylinder High | Offset to Error in Command [15 . . . 8] | | | | | | | |
| Device/Head | x | x | x | DEV | Error Length [11 . . . 8] | | | |
| Status | BSY | DRDY | DF | na | DRQ | OWRIP | na | ERR |

Error register

AVErr shall be set to one.

Recovery Restart

This is an assist to the drive for performing retries. The number returned to the host on an A/V Error can be used (see SetupAVRetry command) to remind the drive where it needs to resume retries to maximize the chance of data recovery in a limited amount of time.

Error Length

Number of sectors being reported as possibly in error. (At least one sector in the reported error length was in error.) If the drive returns zero for the length field(s), it indicates that the error length exceeded $2^{12}-1$ sectors.

Offset to Error in Command

Number of sectors from the start of the command to the first sector which was possibly in error.

Device/Head register

DEV shall indicate the selected device.

Status register

BSY shall be cleared to zero indicating command completion.

DRDY (Disc Ready) shall be set to one.

DF (Device Fault) shall be set to zero.

DRQ (Data Request)shall be cleared to zero.

OWRIP (Offline Write Recovery In Process) shall be one if there is Write

Recovery In Progress upon reporting of this error. (See WriteAV.)

ERR (Error) shall be set to one if an Error register bit is set to one.

3.3 SetupAVRetry

This command is the method by which the host can indicate to the drive that the following A/V read or write command is to be treated as a continuation of a prior A/V command, which had reported an error, but for which the host has now determined there is more time now to perform continuing A/V retrying. Retry assist information (which the drive may, but is not required to, interpret as a retry number) is sent to the drive as shown in Table 4.

TABLE 4

| Register | 7 | 6 | 5 | 4 | 3 | 2 | 1 | 0 |
|---|---|---|---|---|---|---|---|---|
| Features | Recovery Restart | | | | | | | |
| Sector Count | na | | | | | | | |
| Sector Number | na | | | | | | | |
| Cylinder Low | na | | | | | | | |
| Cylinder High | na | | | | | | | |
| Device/Head | X | na | X | DEV | na | | | |
| Command | TBD | | | | | | | |

3.4 WriteAV

When a WriteAV command is received by the drive, the drive shall stop any offline behavior as quickly as possible, seek to the indicated location, and begin writing to the media the data that was provided by the host. The allowed passes at writing the entire command's data should be the first priority of the drive. Thus, if there is a failure writing sector N of a WriteAV command, it should not preclude later sectors that could be written from being written within the time allotted by the host if they could have been written by continuing through the current error. The drive may (but is not required to) save the failed-to-be-written data aside (without hurting the drive's ability to stream the rest of the current write from the host to the media) that was unable to be written, so that it can perform off-line write retries on that part of the data. The first erred sector's location shall be noted by the drive for error reporting. In the case that off-line write retries will not be able to clean up after this write, the write shall still be allowed to continue, so that at least the "first pass" at writing the data can be completed on all commanded sectors. When the allowed passes at writing all of the sectors are complete, the drive shall report one of the ending statuses depicted in Table 5.

TABLE 5

| Status Register | Meaning |
|---|---|
| 0x50 | All of the data from the command was successfully written. |
| 0x51 | A write error which cannot be cleaned up by the drive in off-line mode has occurred. |
| 0x55 | A write error has occurred which may potentially be correctable by the drive in off-line mode. |

3.5 ReadAV

The drive's ECC should be set for full correction all of the time to minimize the uncorrectable read error rate during A/V reads. The drive should allow sectors to continue streaming to the host, regardless of whether there are uncorrectable ECC errors on a sector, once the allowable retries have been exhausted. The following "command-completion" indications shall be used by the drive as shown in Table 6.

TABLE 6

| Status Register | Meaning |
|---|---|
| 0x50 | All of the data for the command was successfully read. |
| 0x51 | An ECC error which cannot be corrected by the drive (at least not without more retries) has occurred. |

If the drive has to perform a ReadAV through a sector that is spared, it will return whatever (uncorrectable ND or prior A/V use) data was in the unalternated location, and may report an A/V error to the host, if an uncorrectable read error occurs as a result.

3.6 FlushCache

The ATA-standard command, normally intended to make sure that cached ND writes are all flushed to the drive before proceeding, works in a similar manner for A/V writes. If the drive reported status 0x55 and error 0x80 in response to a WriteAV command, the host can issue a FlushCache command to the drive to check on the drive's cleanup status. The command will not complete while the drive is still trying to complete an A/V write. The command may be interrupted with a Soft Reset from the host if the host chooses to not wait for the correction attempt. When the command completes, one of the statuses will be reported as shown in FIG. 7.

TABLE 7

| Status Register | Error Register | Meaning |
|---|---|---|
| 0x50 | 0x00 | All of the data from the previous WriteAV command was successfully cleaned up, if any. |
| 0x51 | 0x80 | A WriteAV error, which cannot be cleaned up by the drive in off-line mode, has occurred. |

4 "Normal" Data (Reliability-Critical) Access Commands

These commands will only be issued if the host determines that they can be performed without interfering with any time-critical work that it has for the drive to do. The host can interrupt these commands with a soft reset, and resume time-critical work when the drive completes reset processing. The time to service a command (both ND and A/V, and both Reads and Writes), assuming that no retries are required, is guaranteed to be less than or equal to:

$$T = Ax + B$$

Where the following 16-bit unsigned quantities are defined as shown in Table 8:

TABLE 8

| Quantity | Meaning | ID Word |
|---|---|---|
| A | The inverse of the drive's slowest sustainable sequential transfer rate, in units of nanoseconds/sector. If the transfer of data between the host and drive is slower than this reported number, then the host-disk transfer rate should be used in the time estimate computation, instead. | TBD |
| B | The drive's worst-case command overhead, in microseconds, including worst-case seek and rotational latencies. | TBD |

4.1 WriteND

Since write caching will be disabled, there is no significant delay from the time that the host could try to abort a WriteND with a soft reset, until the drive should respond. As the ATA/ATAPI specification allows, the sectors that were transferred to the drive may be discarded by the drive, and the data on the media may be corrupted.

4.2 ReadND

Since these commands will only be issued when there is no A/V data to read or write, the buffer can be segmented in any fashion that the drive vendor believes may help the host get at its ND-type information. Upon receipt of an A/V data access command, the drive can discard all of the data in its cache, and re-configure the buffer to optimally handle A/V data.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for supplying audio/visual data to a host computer from a disc drive apparatus, the disc drive apparatus including at least one disc platter and control circuitry to store and retrieve data information to and from the disc platter, the method comprising steps of:

(a) determining whether a read/write command received from the host computer relates to audio/visual data which is to be transferred; and (b) limiting the number of retry attempts available during performance of the command, if the command relates to audio/visual data.

2. A method as defined in claim 1 further comprising the steps of:

(c) transferring non-audio/visual data in response to a non-audio/visual read/write command; and (d) transferring audio/visual data in response to the audio/visual read/write command, wherein the step of transferring audio/visual data transfers more sectors of information than transferred during a non-audio/visual read/write data transfer operation.

3. A method as defined in claim 2 wherein the audio/visual data continues to be transferred upon receiving an error.

4. A method as defined in claim 2 wherein the disc drive apparatus further comprises a command count register and at least one other register, the audio/visual data transferring act (d) further comprises:
- (d)(1) receiving a set command indicating large command counts; and
- (d)(2) interpreting command counts using the command count register and a plurality of bits from one other predetermined register.

5. A method as defined in claim 1 further comprising:
- (c) partitioning the disc drive platter into at least one audio/visual data partition and at least one non-audio/visual data partition, wherein location information related to the command is an address within either one of the audio/visual data partition or within one of the non-audio/visual data partition.

6. A method as defined in claim 5 wherein the host computer system partitions the disc drive platter by providing a minimum address value and a maximum address value; and wherein the disc drive apparatus interprets the minimum and maximum address values as the bounds of the audio/visual data partition.

7. A method as defined in claim 5 wherein the host computer system partitions the disc drive platter by providing an address value, wherein the disc drive apparatus interprets the address value as a first boundary of the audio/visual data partition, the disc drive apparatus further using a predetermined address value as a second boundary.

8. A method for accessing time-critical data from a disc drive apparatus, the disc drive apparatus having at least one disc platter and control circuitry to retrieve data information from the disc platter, the method comprising:
- (a) partitioning the disc platter into time-critical data and normal computer data by allocating a plurality of consecutive memory addresses as the time-critical data partition;
- (b) receiving a read command from a host computer system, the command comprising a logical block address and a count value, the count value relating to the amount of time-critical data to be read;
- (c) comparing the logical block address to the memory addresses of the time-critical data partition to determine whether the read command relates to time-critical data;
- (d) if the read command relates to time-critical data,
  - (d)(i) for each time-critical read command, determining a retry value associated with the number of available retries; and
  - (d)(ii) performing the read operation using the number of available retries.

9. A method as defined in claim 8 wherein the determining act (d)(i) comprises:
- (d)(i)(A) calculating a remaining time value by determining the difference between an expected time to complete the read command and an allotted time available to perform the read command; and
- (d)(i)(B) dividing the remaining time value by a retry time value related to the time involved in performing a retry attempt, the result of the division indicating the maximum number of retries available.

10. A method as defined in claim 9 wherein the allotted time value is provided by the host computer system.

11. A method as defined in claim 8 further comprising setting the control circuitry to maximum error correction during operation to minimize the uncorrectable read error rate during time-critical read commands.

12. A method as defined in claim 8 wherein the control circuitry is adapted to store time-critical data to the disc platter, the method further comprising:
- (e) receiving a write command from a host computer system, the command comprising a logical block address and a count value, the count value relating to the amount of time-critical data to be stored to the disc platter;
- (f) determining whether the write command relates to time-critical data; (g) if the write command relates to time-critical data,
  - (g)(i) for each time-critical write command, determining a retry value associated with the number of available retries; and
  - (g)(ii) performing a write operation using the number of available retries, the retries occurring during the write operation.

13. A method as defined in claim 12 wherein the determining act (f) further comprises comparing the logical block address to the memory addresses of the time-critical data partition to determine whether the write command relates to time-critical data.

14. A method as defined in claim 12 wherein the time-critical data continues to be transferred upon receiving an error.

15. A method as defined in claim 12 further comprising:
- (h) logging errors occurring during the write operation, the logged errors relating to uncorrected errors following the write operation; and
- (i) trying to correct logged write errors following the completion of the write operation.

16. A system for storing and retrieving time-critical data and reliability-critical data, the apparatus comprising:
- at least one disc platter capable of storing both the time-critical and reliability critical data;
- a host computer system adapted to provide a time-critical data access command or other predetermined commands;
- access circuitry for controlling the storage and retrieval of the data to and from the at least one disc platter; and
- a processing unit for receiving the time-critical data access command from the host computer system and controlling the access circuitry, the processing unit comprising:
  - a determination module for analyzing each received command and determining whether the command is related to a time-critical data access command or another predetermined command;
  - a retry control module that determines available time for one or more access retries; and
  - an access module for accessing the time-critical data indicated by the time-critical data access command, the access module accessing the time-critical data according to retry control module determinations.

17. A system as defined in claim 16 wherein the retry control module sets the number of retries available during each time-critical data access command and the access module uses the number of retries available during time-critical data access.

18. A system as defined in claim 16 wherein the retry control module schedules retry events upon a determination that time exists to complete the retry event.

19. A system as defined in claim 16 wherein the access module accesses time-critical data following an error condition until the retry control module indicates that a retry event is available.

20. A system as defined in claim 16 wherein the determination module further determines whether large command counts should be used.

21. A system as defined in claim 20 wherein the host computer provides a time-critical data access command indicating large command counts.

22. A system as defined in claim 16 wherein the at least one platter is partitioned into at least one time-critical data region and at least one normal data region.

23. A system as defined in claim 22 wherein the host computer system provides a time-critical data access command using a logical block address and wherein the determination module analyzes the logical block address to determine whether the command relates to a time-critical data access command.

24. A system as defined in claim 16 wherein the time-critical data continues to be transferred upon receiving an error.

* * * * *